US012461550B2

(12) United States Patent
Li et al.

(10) Patent No.: US 12,461,550 B2
(45) Date of Patent: Nov. 4, 2025

(54) REFERENCE VOLTAGE GENERATING DEVICE AND CIRCUIT SYSTEM USING THE SAME

(71) Applicant: NUVOTON TECHNOLOGY CORPORATION, Hsinchu (TW)

(72) Inventors: Chih Ming Li, Zhubei (TW); Cheng-Tao Li, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 159 days.

(21) Appl. No.: 18/493,859

(22) Filed: Oct. 25, 2023

(65) Prior Publication Data

US 2024/0264622 A1 Aug. 8, 2024

(30) Foreign Application Priority Data

Feb. 3, 2023 (TW) ................................ 112103892

(51) Int. Cl.
*G05F 3/30* (2006.01)

(52) U.S. Cl.
CPC ...................................... *G05F 3/30* (2013.01)

(58) Field of Classification Search
CPC ......................................................... G05F 3/30
See application file for complete search history.

(56) References Cited

U.S. PATENT DOCUMENTS

2008/0018319 A1* 1/2008 Chang ........................ G05F 3/30 323/315
2008/0042737 A1* 2/2008 Kim .......................... G05F 3/30 327/539
2013/0257396 A1* 10/2013 Tung ......................... G05F 3/30 323/265
2023/0107389 A1* 4/2023 Wu ........................... G05F 3/30 323/313

* cited by examiner

*Primary Examiner* — Alex Torres-Rivera
(74) *Attorney, Agent, or Firm* — MUNCY, GEISSLER, OLDS & LOWE, P.C.

(57) ABSTRACT

A referential voltage generating device includes a bandgap-voltage generating unit, a control-comparison unit, a difference current generating unit and a referential voltage generating unit. The bandgap-voltage generating unit generates a second proportional to absolute temperature (PTAT) current and a bandgap-voltage based on a first PTAT current and a complementary to an absolute temperature (CTAT) voltage, both of which are generated in the bandgap-voltage generating unit. The control-comparison unit generates a PTAT voltage based on the second PTAT current, and generates a control voltage based on a difference voltage value between the PTAT voltage and the bandgap voltage. The difference current generating unit generates the difference current based on the control voltage, wherein the difference current is proportional to an absolute voltage value of the control voltage. The referential voltage generating unit generates a referential voltage based on the bandgap voltage and the differential current.

10 Claims, 5 Drawing Sheets

REFERENCE VOLTAGE GENERATING DEVICE AND CIRCUIT SYSTEM USING THE SAME

FIELD OF THE INVENTION

The present invention relates to a referential voltage generating device and a circuit system using the same, and more particularly, to a referential voltage generating device capable of compensating the temperature offset of the referential voltage at high/low temperature and a circuit system using the same.

BACKGROUND OF THE INVENTION

Please refer to FIG. 1, which is a schematic circuit diagram of a referential voltage generating device according to a related art technique. The conventional referential voltage generating device 1 comprises an energy gap voltage generating circuit 11 and an amplifying circuit 12. The bandgap-voltage generating circuit 11 is composed of two BJTs Q1 and Q2, a plurality of resistors R0, R1, R2 and R2', an operational amplifier CMP1 and a p-channel field effect transistor (FET) MP1. The amplifying circuit 12 is composed of an operational amplifier CMP2, a p-channel FET MP2 and a plurality of resistors R3 and R4.

The bandgap-voltage generating circuit 11 makes the current flowing through the resistor R1 be (VEB2–VEB1)/R1 through the operation of the operational amplifier CMP1, in which VEB2 is the voltage between the emitter and base of the bipolar junction transistor (BJT) Q1, and the VEB1 is the voltage between the emitter and base of the bipolar junction transistor (BJT) Q2. The current flowing through the resistor R1 is a positive temperature coefficient current, that is, the current value is proportional to the temperature. Based on the above-mentioned positive temperature coefficient current and voltage VEB2 which is a negative temperature coefficient voltage, e.g., the voltage value is inversely proportional to temperature, the bandgap-voltage generation circuit 11 generates a bandgap-voltage VBG that is less vulnerable to the temperature, and then the bandgap-voltage VBG is processed by the amplifier circuit 12 to generate a referential voltage VREF.

Please refer to FIG. 2, which is a voltage-vs-temperature graph of the referential voltage of the referential voltage generating device of FIG. 1. Although the bandgap-voltage VBG is less vulnerable to the temperature, the voltage/temperature curve of the final referential voltage VREF will still bend at high temperature and low temperature because the BJTs Q1 and Q2 still conduct a nonlinear influence on the temperature, and the difference between the referential voltage VREF at normal temperature and that at high temperature or low temperature is more likely to be as high as 3.5 millivolts.

SUMMARY OF THE INVENTION

As can be understood from the above description that the technical problem to be solved by the present invention is that the voltage/temperature curve of the referential voltage generated by the referential voltage generating device of the aforementioned conventional technique could bend at high temperature and low temperature. In view of this, the referential voltage generating device proposed by the present invention is committed to reducing the phenomenon that the voltage/temperature curve of the referential voltage will bend at high/low temperature, so as to provide a referential voltage of higher accuracy.

In order to solve the above-mentioned conventional problems, an embodiment of the present invention provides a referential voltage generating device for generating a referential voltage. The referential voltage comprises a bandgap-voltage generating unit, a control-comparison unit, a differential current generating unit and a referential voltage generating unit. The bandgap-voltage generating unit is arranged to internally generate a first positive temperature coefficient current and a negative temperature coefficient voltage, and generate a second positive temperature coefficient current and a bandgap-voltage based on the first positive temperature coefficient current and the negative temperature coefficient voltage. The control-comparison unit electrically is connected to the bandgap-voltage generating unit, and arranged to receive the second positive temperature coefficient current and the bandgap-voltage, generate a positive temperature coefficient voltage based on the second positive temperature coefficient current, and generate a control voltage based on a difference voltage value between the positive temperature coefficient voltage and the bandgap-voltage. The differential current generating unit is electrically connected to the control-comparison unit, and arranged to receive the control voltage and generating a differential current based on the control voltage, wherein the differential current is proportional to an absolute voltage value of the control voltage. The referential voltage generating unit is electrically connected to the bandgap-voltage generating unit and the differential current generating unit, and arranged to receive the bandgap-voltage and the differential current, and generate the referential voltage based on the bandgap-voltage and the differential current.

In order to solve the above-mentioned problems encountered in related art techniques, an embodiment of the present invention provides another referential voltage generating device for generating a referential voltage. The referential voltage generating device comprises a bandgap-voltage generating unit, a control-comparison unit, a differential current generating unit and referential voltage generating unit. The bandgap-voltage generating unit is arranged to internally generate a first negative temperature coefficient current and a positive temperature coefficient voltage, and generates a second negative temperature coefficient current and a bandgap-voltage based on the first negative temperature coefficient current and the positive temperature coefficient voltage. The control-comparison unit electrically is connected to the bandgap-voltage generating unit, and arranged to receive the second negative temperature coefficient current and the bandgap-voltage, generate a negative temperature coefficient voltage based on the second negative temperature coefficient current, and generate a control voltage based on a difference voltage value between the negative temperature coefficient voltage and the bandgap-voltage. The differential current generating unit is electrically connected to the control-comparison unit, and arranged to receive the control voltage and generating a differential current based on the control voltage, wherein the differential current is proportional to an absolute voltage value of the control voltage. The referential voltage generating unit is electrically connected to the bandgap-voltage generating unit and the differential current generating unit, and arranged to receive the bandgap-voltage and the differential current, and generate the referential voltage based on the bandgap-voltage and the differential current.

In order to solve the above-mentioned problems encountered in related art techniques, an embodiment of the present invention provides a circuit system which comprises any of the above-mentioned referential voltage generating devices and at least one function circuit, wherein the at least one function circuit is electrically connected to the referential voltage generating device, receives the referential voltage, and performs at least one function based on the referential voltage.

As mentioned above, the referential voltage generating device provided by the embodiment of the present invention can generate a more accurate referential voltage to at least one function circuit of the circuit system, and the voltage/temperature curve of the referential voltage will not be bent at high or low temperature, and the circuit system using the referential voltage generating device will not bend at high or low temperature. Hence, no matter the circuit system is operated at high or low temperature, misoperation or calculation errors can be avoided.

BRIEF DESCRIPTION OF THE DRAWINGS

In order to make the above and other objects, features, advantages, and embodiments of the present invention more obvious and easier to understand, the description of the attached drawings is given as follows.

DETAILED DESCRIPTION OF PREFERRED EMBODIMENTS

In one embodiment of the present invention, a referential voltage generating device compares a positive temperature coefficient voltage that is internally generated with an energy gap voltage to generate a differential current, wherein the differential current is related to a differential voltage value between the positive temperature coefficient voltage and the energy gap voltage. Next, by using differential current to compensate the generated referential voltage, the odds the voltage/temperature curve of the referential voltage bends at high or low temperature can be reduced. In another embodiment of the present invention, a referential voltage generating device compares a negative temperature coefficient voltage that is internally generated with an energy gap voltage to generate a differential current, wherein the differential current is related to a differential voltage value between the negative temperature coefficient voltage and the energy gap voltage. Next, by using differential current to compensate the generated referential voltage, the odds the voltage/temperature curve of the referential voltage bends at high or low temperature can be reduced.

Figure 1:
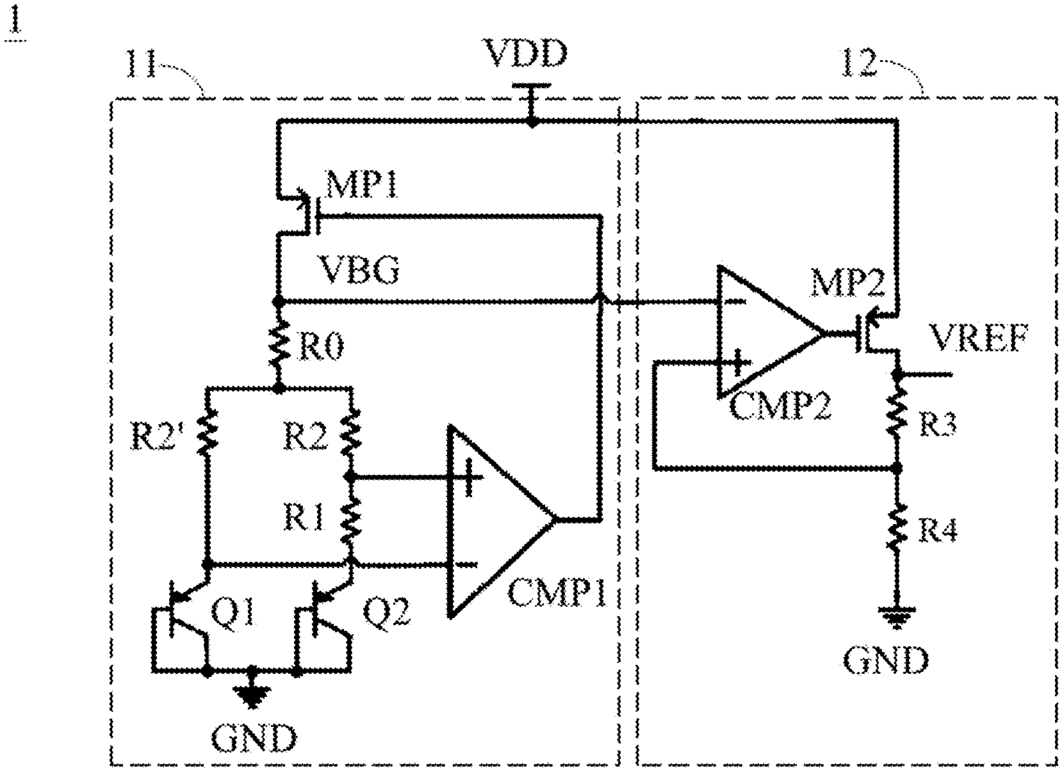
FIG. 1 Prior Art
FIG. 1 is a circuit diagram illustrating a related art referential voltage generating device.
Figure 2:
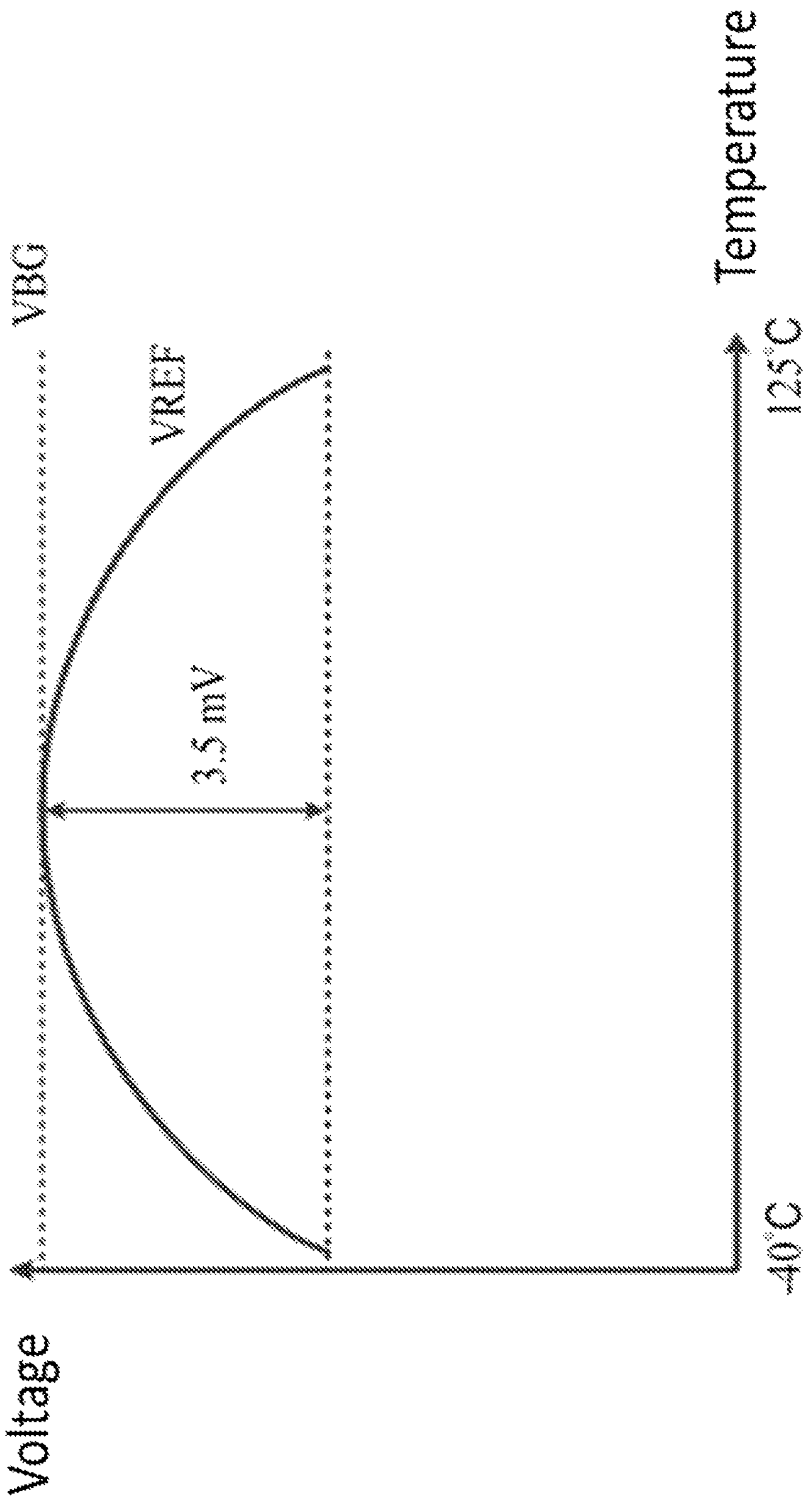
FIG. 2 is a voltage/temperature graph of the bandgap-voltage of the referential voltage generating device of FIG. 1.
Figure 3:
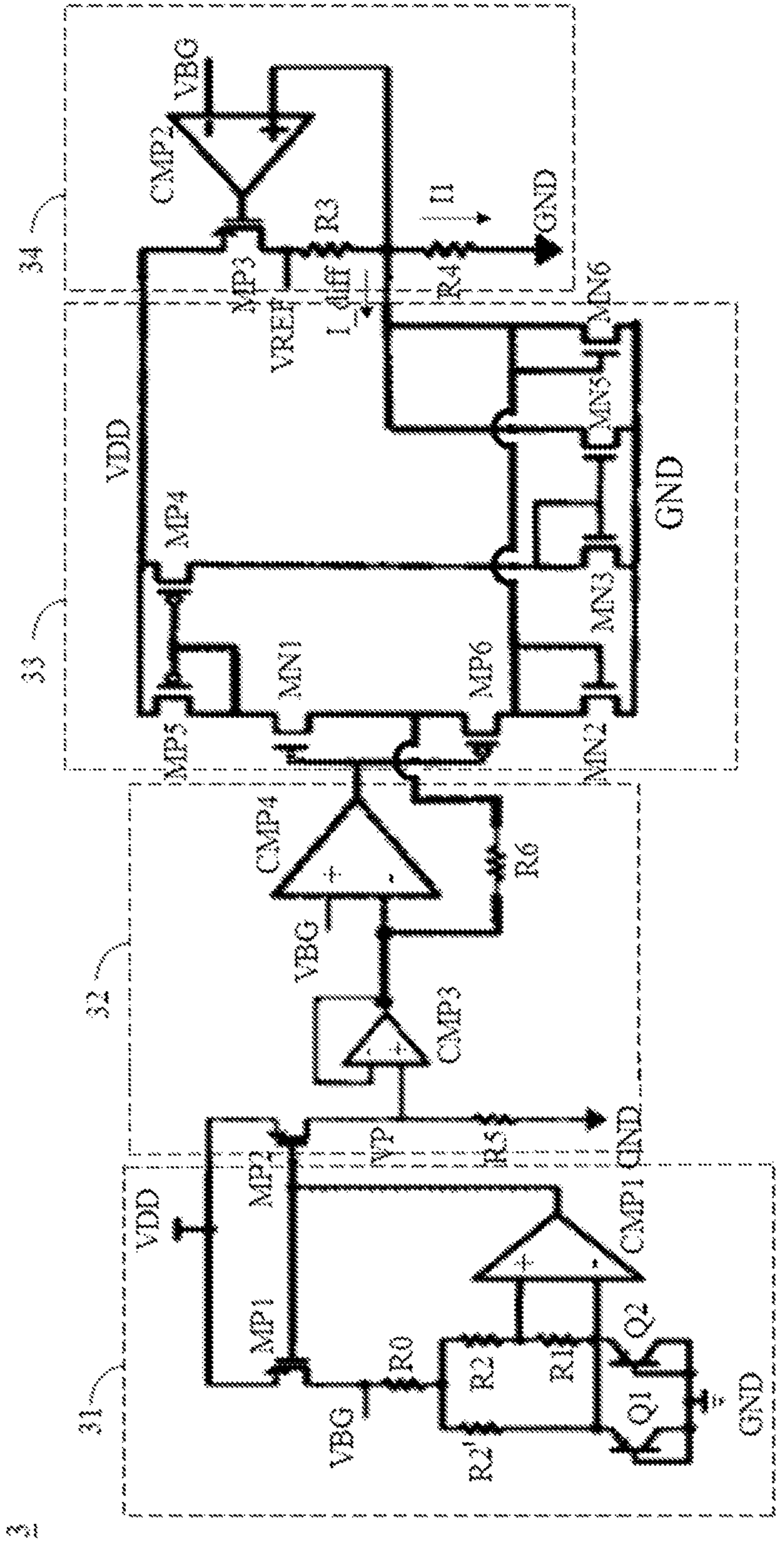
FIG. 3 is a circuit diagram illustrating a referential voltage generating device according to an embodiment of the present invention.

In addition, in the embodiment of the present invention, a circuit system is also provided, which comprises a referential voltage generating device as shown in an embodiment of the present invention and at least one function circuit for receiving the referential voltage. The function circuit is electrically connected to the referential voltage generating device, receives the referential voltage, and executes at least one function based on the referential voltage. Because the referential voltage generator can generate more accurate referential voltage, the probability of malfunction or calculation error of the function circuit, especially at high or low temperature can be also reduced. Further, the function circuit can be a voltage regulator, a digital-to-analog converter, an analog-to-digital converter, a microcontroller, a transmitter, a receiver, a digital signal processor, a central processing unit, a transceiver, an image processor, an audio processor, an internet of things device, a memory device, or a storage device, but the invention is not limited to the above, however.

please refer to FIG. 3, which is a schematic circuit diagram of a referential voltage generating device according to an embodiment of the present invention. The referential voltage generating device 3 is used to generate a referential voltage VREF, and comprises a bandgap-voltage generating unit 31, a control comparing unit 32, a differential current generating unit 33 and a referential voltage generating unit 34. The bandgap-voltage generating unit 31 internally generates a first positive temperature coefficient current (i.e., (VEB2−VEB1)/R1) and a negative temperature coefficient voltage (i.e., VEB2), and generates a second positive temperature coefficient current (i.e., the current flowing through the p-channel FET MP1) and a bandgap-voltage VBG based on the first positive temperature coefficient current and the negative temperature coefficient voltage, in which VEB2 is the voltage between the emitter and base of the BJT Q1, and VEB1 is the voltage between the emitter and base of the BJT Q2. The control-comparison unit 32 is electrically connected to the bandgap-voltage generating unit 31, receives the second positive temperature coefficient current and the bandgap-voltage VBG, generates the positive temperature coefficient voltage VP based on the second positive temperature coefficient current, and generates a control voltage based on the difference voltage value between the positive temperature coefficient voltage VP and the bandgap-voltage VBG.

The differential current generating unit 33 is electrically connected to the control-comparison unit 32, receives the control voltage, and generates a differential current I_diff based on the control voltage, wherein the differential current I_diff is proportional to the absolute voltage value of the control voltage, i.e., an absolute value of the differential voltage value between the positive temperature coefficient voltage VP and the bandgap-voltage VBG. The referential voltage generating unit 34 is electrically connected to the bandgap-voltage generating unit 31 and the differential current generating unit 33, receives the bandgap-voltage VBG and the differential current I_diff, and generates the referential voltage VREF based on the bandgap-voltage VBG and the differential current I_diff.

Figure 4:
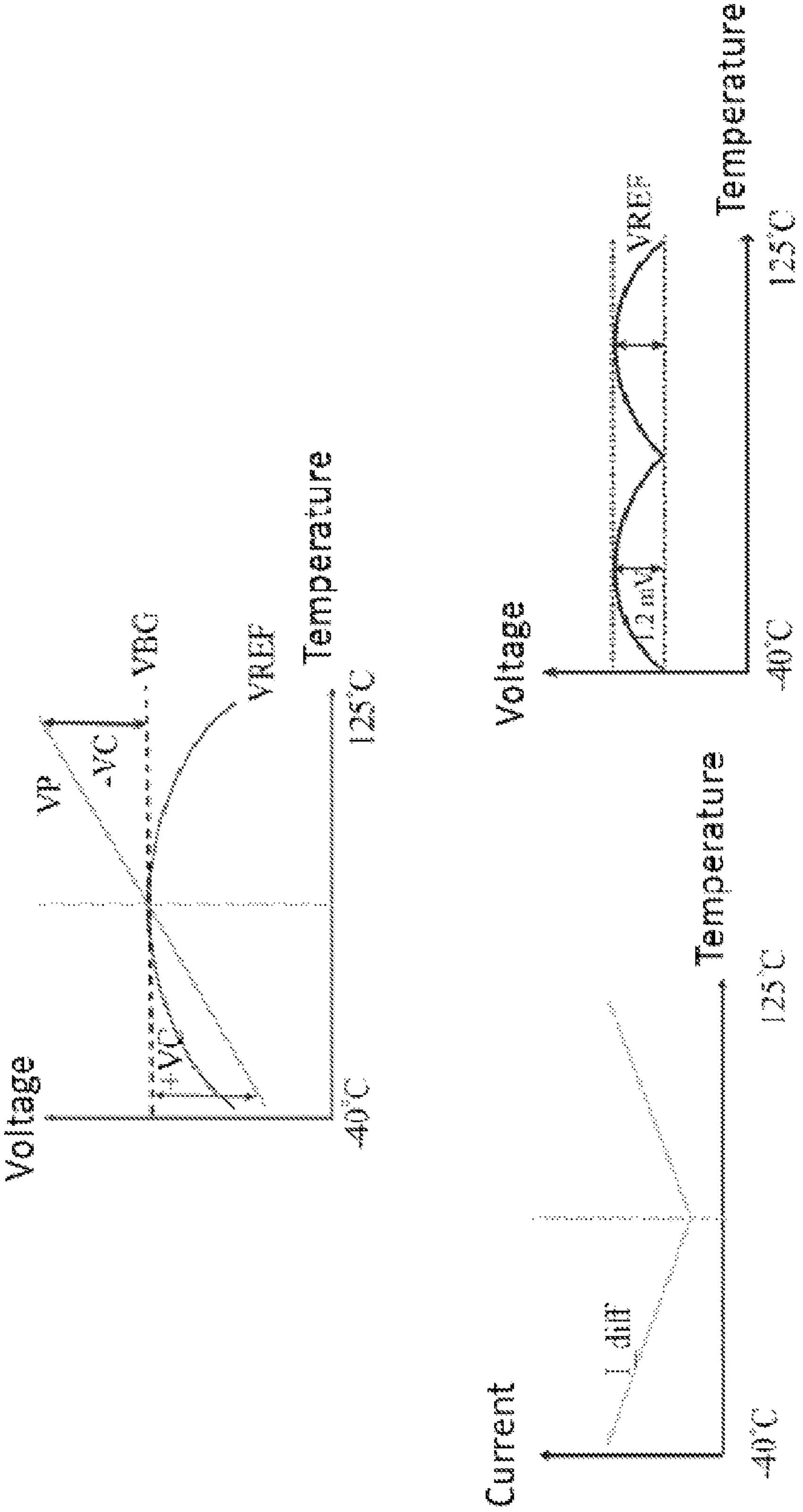
FIG. 4 illustrates an energy gap voltage, a voltage-vs-temperature graph of a referential voltage, and a current-vs-temperature graph of a differential current of the referential voltage generating device of FIG. 3.

Further, please refer to FIGS. 3 and 4. FIG. 4 illustrates an energy gap voltage, a voltage-vs-temperature graph of a referential voltage, and a current-vs-temperature graph of a differential current of the referential voltage generating device of FIG. 3. The energy gap voltage VBG, referential voltage VREF and positive temperature coefficient voltage VP are shown in the upper part of FIG. 4. The voltage/temperature curve of referential voltage VREF will bend at high temperature (125° C.) and low temperature (−40° c.), while the energy gap voltage VBG hardly varies with temperature, and the positive temperature coefficient voltage VP increases with the temperature. The maximum voltage difference between the positive temperature coefficient voltage VP and the energy gap voltage VBG is +VC, and the minimum voltage difference between the positive temperature coefficient voltage VP and the energy gap voltage VBG is −VC.

Please refer to the graph in the lower-left corner of FIG. 4, which shows the current-vs-temperature graph of the differential current. When the absolute value of the differential voltage between the positive temperature coefficient voltage VP and the bandgap-voltage VBG becomes greater, the generated differential current I_diff will be also greater. Therefore, the difference current I_diff under either high temperature (e.g., 125° C.) of low temperature (e.g., −40° c.) is the largest, so that the voltage value of the compensation referential voltage VREF can be increased to compensate being the voltage/temperature curve of the referential voltage VREF for bending at high or low temperature.

The referential voltage is represented by "VREF=VBG+(I_diff+I1)*R3" (i.e., the bandgap-voltage VBG plus the voltage across the resistor R3), the current I1 is represented by "I1=VBG/R4", and the values of the resistor R4 and the bandgap-voltage VBG are fixed, and thus the greater the difference current I_diff, the greater the referential voltage VREF. Therefore, the bending of the voltage/temperature curve of the referential voltage VREF at high temperature (125° C.) or low temperature (−40 c) can be properly compensated. Moreover, as shown in the graph at the bottom right of FIG. 4, the maximum difference between the referential voltage VREF and the high or low temperature is only 1.2 millivolts, that is, the accuracy of the referential voltage VREF is effectively improved, and the voltage/temperature curve of the referential voltage VREF will be relatively flat.

Referring to FIG. 3, the bandgap-voltage generating unit 31 comprises a positive temperature coefficient current generating unit (comprising an operational amplifier CMP1, BJTs Q1 and Q2, and resistors R1, R2 and R2') and a current-to-voltage converting unit (comprising a resistor R0 and a p-channel FET MP1). The positive temperature coefficient current generating unit is used to generate a first positive temperature coefficient current ((VEB2−VEB1)/R1) and a negative temperature coefficient voltage (VEB2). The current-to-voltage conversion unit is electrically connected to the positive temperature coefficient current generating unit, receives the first positive temperature coefficient current and the negative temperature coefficient voltage, and generates the second positive temperature coefficient current and the positive temperature coefficient voltage VP based on the first positive temperature coefficient current and the negative temperature coefficient voltage.

Further, the positive input end of the operational amplifier CMP1 is respectively electrically connected to the first end of the resistor R1, and the negative input end of the operational amplifier CMP1 is electrically connected to the emitter of the BJT Q1. The base and collector of each of the BJTs Q1 and Q2 is electrically connected to a low voltage, e.g., the ground voltage GND. The emitter of the BJT Q1 is electrically connected to the second end of the resistor R2'. The emitter of the BJT Q2 is electrically connected to the second end of the resistor R1, the first end of the resistor R1 is electrically connected to the second end of the resistor R2, the first end of the resistor R2 and the first end of the resistor R2' are electrically connected to the second end of the resistor R0, the first end of the resistor R0 is electrically connected to the drain of the p-channel FET MP1, and the source of the p-channel FET MP1 is electrically connected to a high voltage (e.g., a supply voltage VDD). The gate of the p-channel FET MP1 is electrically connected to the output end of the operational amplifier CMP1, wherein the first positive temperature coefficient current flows through the resistors R1 and R2, the bandgap-voltage VBG is generated at the first end of the resistor R0, and the positive temperature coefficient current flows through the p-channel FET MP1.

Referring to FIG. 3, the control-comparison unit 32 comprises a current-to-voltage conversion unit (comprising a p-channel FET MP2, an operational amplifier CMP3 and a resistor R5), an operational amplifier CMP4 and a negative feedback resistor R6. The current-to-voltage conversion unit is electrically connected to the bandgap-voltage generating unit 31, receives the second positive temperature coefficient current, and generates a positive temperature coefficient voltage VP based on the second positive temperature coefficient current. The operational amplifier CMP4 is electrically connected to the first terminal of the resistor R0 of the bandgap-voltage generating unit 31, wherein the positive input end of the operational amplifier CMP4 receives the bandgap-voltage VBG, the negative input end of the operational amplifier CMP4 receives the positive temperature coefficient voltage VP, and the output end of the operational amplifier CMP4 is electrically connected to the differential current generating unit 33. The operational amplifier CMP4 is used for comparing the bandgap-voltage VBG with the positive temperature coefficient voltage VP to obtain a differential voltage value, and amplifying the differential voltage value to generate a control voltage. Both ends of the negative feedback resistor R6 are electrically connected to the differential current generating unit 33 (respectively the source of the n-channel FET MN1 and the source of the p-channel FET MP6) and the negative input end of the operational amplifier CMP4. The gate and source of the p-channel FET MP2 are electrically connected to the gate of the p-channel FET MP1 of the bandgap-voltage generating unit 31, and the drain of the p-channel FET MP2 is electrically connected to the first end of the resistor R5 and the positive input end of the operational amplifier CMP3. The second end of the resistor R5 is electrically connected to a low voltage, and the output end of the operational amplifier CMP3 is electrically connected to the negative input end of the operational amplifier CMP3.

Referring to FIG. 3, the differential current generating unit 33 comprises a current mirror selector which comprises the p-channel FET MP6 and the n-channel FET MN1, a first current mirror unit which comprises the p-channel FETs MP5 and MP4 and the n-channel FETs MN3 and MN5, and a second current mirror unit which comprises the n-channel FETs MN2 and MN6. The input end of the current mirror selector is electrically connected to the control-comparison unit 32 (the output end of the operational amplifier CMP4), and one end of the current mirror selector is electrically connected to the control-comparison unit 32 (one end of the resistor R6), and generates a current mirror selection signal based on the control voltage.

The first current mirror unit is electrically connected to the first end of the current mirror selector and the referential voltage generating unit 34 (the second end of the resistor R3), and is used for providing the differential current I_diff to the referential voltage generating unit 34 based on the current mirror selection signal. The second current mirror unit is electrically connected to the second end of the current mirror selector and the referential voltage generating unit 34 (the second end of the resistor R3), and is used for selecting signals based on the current mirror and providing the differential current I_diff to the referential voltage generating unit 34. Note that only one of the first current mirror unit and the second current mirror unit is turned on by the current mirror selection signal to provide the differential current I_diff.

Further, the gate of the p-channel FET MP6 and the gate of the n-channel FET MN1 are electrically connected to the output end of the operational amplifier CMP4 of the control-comparison unit 32, and receive the control voltage. The source of the p-channel FET MP6 is electrically connected to the source of the n-channel FET MN1, and is used for generating a current mirror selection signal. The drain of the n-channel FET MN1 is electrically connected to the drain of the p-channel FET MP5, the gate of the p-channel FET MP5 is electrically connected to the drain of the p-channel FET MP5 and the gate of the p-channel FET MP6, and the source of the p-channel FET MP5 is electrically connected to a high voltage. The drain of the p-channel FET MP4 is electrically connected to the drain of the n-channel FET MN3, the source of the n-channel FET MN3 and the source of the third n-channel FET MN5 are electrically connected to a low voltage, and the gate of the n-channel FET MN3 is electrically connected to the drain of the n-channel FET MN5. The drain of the n-channel FET MN5 is electrically connected to the second end of the resistor R3 of the referential voltage generating unit 34, and the drain of the n-channel FET MN5 is used for generating the differential current I_diff when the first current mirror unit is turned on. The drain of the n-channel FET MN2 is electrically connected to the drain of the p-channel FET MP6, the gate of the n-channel FET MN2 is electrically connected to the drain of the n-channel FET MN6, the source of the n-channel FET MN2 is electrically connected to a low voltage, and the gate of the n-channel FET MN6 is electrically connected to the drain of the n-channel FET MN6. The drain of the n-channel FET MN6 is electrically connected to the second terminal of the resistor R3 of the referential voltage generating unit 34, and the drain of the n-channel FET MN5 is used to generate the differential current I_diff when the second current mirror unit is turned on.

Referring to FIG. 3, the referential voltage generating unit 34 comprises a p-channel FET MP3, an operational amplifier CMP2 and resistors R3 and R4, wherein the source of the p-channel FET MP3 is electrically connected to a high voltage, the drain of the p-channel FET MP3 is used for outputting a referential voltage VREF and the first end of the resistor R3, and the output end of the operational amplifier CMP2 is electrically connected to the gate of the p-channel FET MP3. The negative input end of the operational amplifier CMP2 is electrically connected to the bandgap-voltage generating unit 31 (the first end of the resistor R0) and receives the bandgap-voltage VBG. The positive input end of the operational amplifier CMP4 is electrically connected to the second end of the resistor R3 and the first end of the resistor R4, which is electrically connected to a low voltage. The second end of the resistor R3 is electrically connected to the drains of the n-channel FETs MN5 and MN6 of the differential current generating unit 33.

Figure 5:
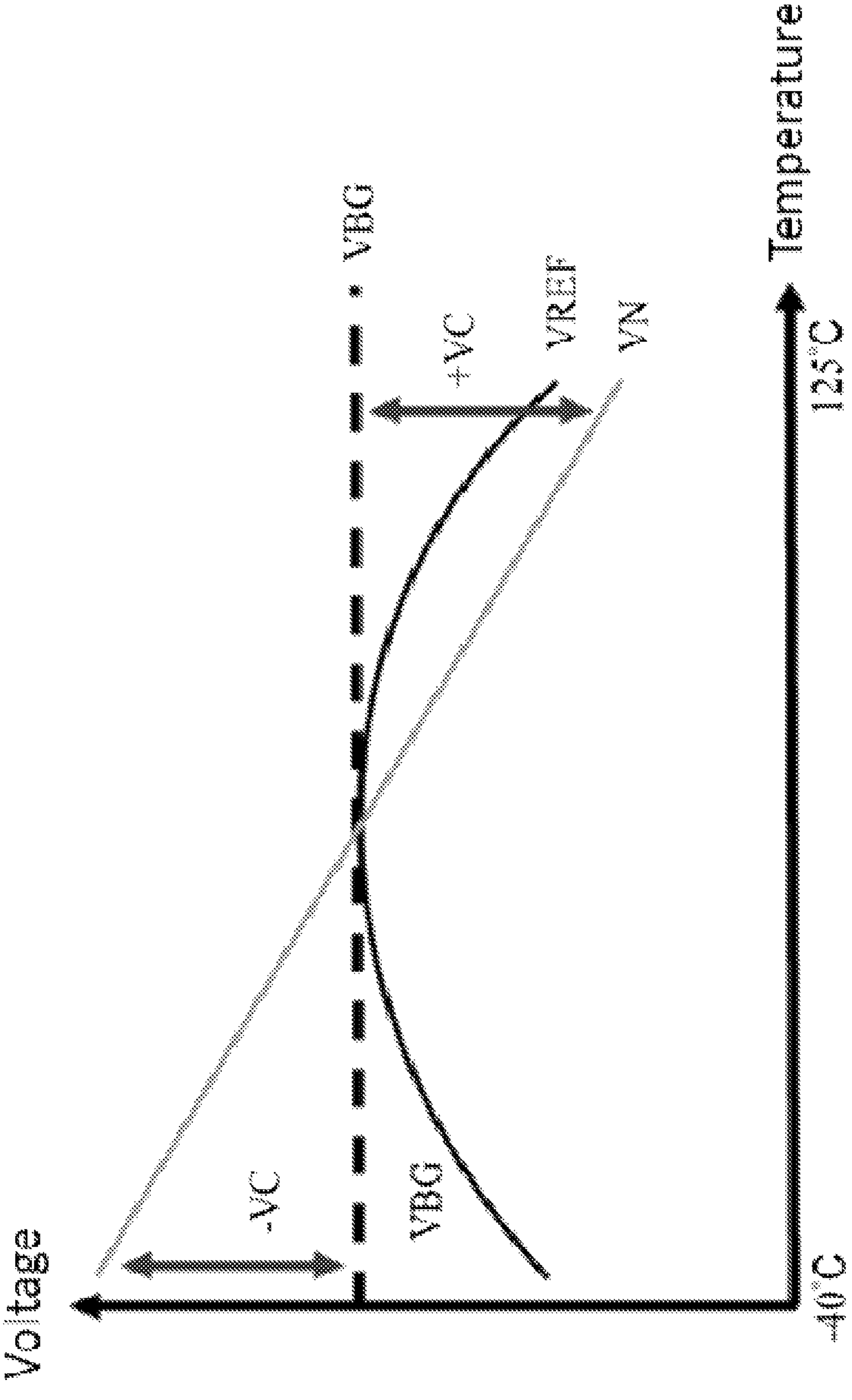
FIG. 5 is a voltage/temperature graph of a referential voltage generating device according to another embodiment of the present invention.

Although the above embodiments use the positive temperature coefficient voltage for compensation, but the present invention is not limited thereto. Please refer to FIG. 5, which is a voltage-vs-temperature graph of a referential voltage generating device according to another embodiment of the present invention. In FIG. 5, the negative temperature coefficient voltage VN is used for comparison with the bandgap-voltage VBG, and the absolute value of the voltage difference between the negative temperature coefficient voltage VN and the bandgap-voltage VBG is used to generate a difference current I_diff to compensate for the situation where the voltage/temperature curve of the referential voltage VREF may bend at high temperature (e.g., 125° C.) and low temperature (e.g., −40° C.).

Accordingly, an embodiment of the present invention provides another referential voltage generating device, which is used to generate a referential voltage and comprises a bandgap-voltage generating unit, a control-comparison unit, a differential current generating unit and a referential voltage generating unit. The bandgap-voltage generating unit internally generates a first negative temperature coefficient current and a positive temperature coefficient voltage, and generates a second negative temperature coefficient current and a bandgap-voltage based on the first negative temperature coefficient current and the positive temperature coefficient voltage. The control-comparison unit is electrically connected to the bandgap-voltage generating unit, receives the second negative temperature coefficient current and the bandgap-voltage, generates the negative temperature coefficient voltage based on the second negative temperature coefficient current, and generates the control voltage based on the difference voltage value between the negative temperature coefficient voltage and the bandgap-voltage. The differential current generating unit is electrically connected to the control-comparison unit, receives the control voltage, and generates differential current based on the control voltage, wherein the differential current is proportional to the absolute voltage value of the control voltage. The referential voltage generating unit is electrically connected to the bandgap-voltage generating unit and the differential current generating unit, receives the bandgap-voltage and the differential current, and generates the referential voltage based on the bandgap-voltage and the differential current.

In view of above, the present invention mainly uses the voltage difference between the positive temperature coefficient voltage or negative temperature coefficient voltage that are internally generated in the referential voltage generating device and the bandgap voltage to generate a differential current, and the differential current is proportional to the absolute value of the voltage difference, so that the situation where the voltage/temperature curve of the referential voltage may bend at high temperature and low temperature can be compensated. Therefore, the voltage/temperature curve of the referential voltage will be smoother, and the voltage difference between high temperature and low temperature and general temperature can be greatly reduced, thereby outputting a more accurate referential voltage that is less vulnerable to temperature. Therefore, the circuit system using the referential voltage generating device of the present invention is less likely to encounter misoperation or calculation errors, either operating at high or low temperature.

Although the present invention has been disclosed by various examples, those are not intended to limit the present invention. Those skilled in the art in the technical field of the present invention can make some changes and embellishments without departing from the spirit and scope of the present invention. Therefore, the scope of protection of the present invention should be as defined in the appended patent application.

What is claimed is:

1. A referential voltage generating device for generating a referential voltage, comprising:

a bandgap-voltage generating unit, configured to internally generate a first positive temperature coefficient current and a negative temperature coefficient voltage, and generate a second positive temperature coefficient current and a bandgap-voltage based on the first positive temperature coefficient current and the negative temperature coefficient voltage;

a control-comparison unit electrically connected to the bandgap-voltage generating unit, and configured to receive the second positive temperature coefficient current and the bandgap-voltage, generate a positive temperature coefficient voltage based on the second positive temperature coefficient current, and generate a control voltage based on a difference voltage value between the positive temperature coefficient voltage and the bandgap-voltage;

a differential current generating unit electrically connected to the control-comparison unit, configured to receive the control voltage and generate a differential current based on the control voltage, wherein the differential current is proportional to an absolute voltage value of the control voltage; and a referential voltage generating unit electrically connected to the bandgap-voltage generating unit and the differential current generating unit, and configured to receive the bandgap-voltage and the differential current, and generate the referential voltage based on the bandgap-voltage and the differential current.

2. The referential voltage generating device according to claim 1, wherein the bandgap-voltage generating unit comprises:

a positive temperature coefficient current generating unit configured to generate the first positive temperature coefficient current and the negative temperature coefficient voltage; and a current-to-voltage conversion unit electrically connected to the positive temperature coefficient current generating unit, and configured to receive the first positive temperature coefficient current and the negative temperature coefficient voltage, and generate the second positive temperature coefficient current and the positive temperature coefficient voltage based on the first positive temperature coefficient current and the negative temperature coefficient voltage.

3. The referential voltage generating device according to claim 2, wherein the positive temperature coefficient current generating unit comprises a first operational amplifier, a first bipolar junction transistor (BJT), a second BJT, a first resistor, a second resistor and a third resistor, wherein the current-to-voltage converting unit comprises a fourth resistor and a first p-channel field effect transistor (FET), a positive input end and a negative input end of the first operational amplifier are respectively electrically connected to a first end of the first resistor and an emitter of the first BJT, a base and a collector of the first BJT are electrically connected to a low voltage, a base and a collector of the second BJT are electrically connected to the low voltage, an emitter of the second BJT is electrically connected to a second end of the first resistor, an emitter of the first BJT is electrically connected to a second end of the third resistor, the first end of the first resistor is electrically connected to a second end of the second resistor, a first end of the second resistor and a first end of the third resistor are electrically connected to a second end of the fourth resistor, a first end of the fourth resistor is electrically connected to a drain of the first p-channel FET, a source of the first p-channel FET is electrically connected to a high voltage, a gate of the first p-channel FET is electrically connected to an output end of the first operational amplifier, the first positive temperature coefficient current flows through the first resistor and the second resistor, the bandgap-voltage is generated at the first end of the fourth resistor, and the second positive temperature coefficient current flows through the first p-channel FET.

4. The referential voltage generating device according to claim 1, wherein the control-comparison unit comprises:

a current-to-voltage conversion unit electrically connected to the bandgap-voltage generating unit, and configured to receive the second positive temperature coefficient current and generate the positive temperature coefficient voltage based on the second positive temperature coefficient current;

a second operational amplifier electrically connected to the bandgap-voltage generating unit, wherein a positive input end and a negative input end of the second operational amplifier respectively receive the bandgap-voltage and the positive temperature coefficient voltage, and an output end of the second operational amplifier is electrically connected to the differential current generating unit, and the second operational amplifier is configured to compare the bandgap-voltage with the positive temperature coefficient voltage, to obtain the differential voltage value and amplify the differential voltage value in order to generate the control voltage; and a negative feedback resistor, wherein two ends of the negative feedback resistor are respectively electrically connected to the differential current generating unit and the negative input end of the second operational amplifier;

wherein the current-to-voltage conversion unit comprises a second p-channel FET, a third operational amplifier and a fifth resistor, a gate and a source of the second p-channel FET are electrically connected to the bandgap-voltage generating unit and a high voltage, a drain of the second p-channel FET is electrically connected to a first end of the fifth resistor and a positive input end of the third operational amplifier, a second end of the fifth resistor is electrically connected to a low voltage, and an output end of the third operational amplifier is electrically connected to a negative input end of the third operational amplifier.

5. The referential voltage generating device according to claim 1, wherein the differential current generating unit comprises:

a current mirror selector, wherein an input end of the current mirror selector is electrically connected to the control-comparison unit, and one end of the current mirror selector is electrically connected to the control-comparison unit and generates a current mirror selection signal based on the control voltage;

a first current mirror unit, electrically connected to a first end of the current mirror selector and the referential voltage generating unit, wherein the first current mirror unit is configured to provide the differential current to the referential voltage generating unit based on the current mirror selection signal; and a second current mirror unit, electrically connected to a second end of the current mirror selector and the referential voltage generating unit, wherein the second current mirror unit is configured to provide the differential current to the referential voltage generating unit based on the current mirror selection signal;

wherein only one of the first current mirror unit and the second current mirror unit is turned on based on the current mirror selection signal to provide the differential current.

6. The referential voltage generating device as claimed in claim 5, wherein the current mirror selector comprises a third p-channel FET and a first n-channel FET, the first current mirror unit comprises a fourth p-channel FET, a fifth p-channel FET, a second n-channel FET and a third n-channel FET, the second current mirror unit comprises a fourth n-channel FET and a fifth n-channel FET, a gate of the third p-channel FET and a gate of the first n-channel FET are electrically connected to the control-comparison unit and receive the control voltage, a source of the third p-channel FET is electrically connected to a source of the first n-channel FET, and arranged to generate the current mirror selection signal, a drain of the first n-channel FET is electrically connected to a drain of the fourth p-channel FET, a gate of the fourth p-channel FET is electrically connected to the drain of the fourth p-channel FET and a gate of the fifth p-channel FET, a source of the fourth p-channel FET and a source of the fifth p-channel FET are electrically connected to a high voltage, a drain of the fifth p-channel FET is electrically connected to a drain of the second n-channel FET, a source of the second n-channel FET and a source of the third n-channel FET are electrically connected to a low voltage, a gate of the second n-channel FET is electrically connected to the drain of the second n-channel FET and a gate of the third n-channel FET, a drain of the third n-channel FET is electrically connected to the referential voltage generating unit, and when the first current mirror unit is turned on, the differential current is generated, wherein a drain of the fourth n-channel FET is electrically connected to a drain of the third p-channel FET, a gate of the fourth n-channel FET is electrically connected to a drain of the fourth n-channel FET, a source of the fourth n-channel FET and a source of the fifth n-channel FET are electrically connected to the low voltage, a gate of the fifth n-channel FET is electrically connected to the drain of the fifth n-channel FET, the drain of the fifth n-channel FET is electrically connected to the referential voltage generating unit, and the differential current is generated when the drain of the fifth n-channel FET is turned on by the second current mirror unit.

7. The referential voltage generating device according to claim 1, wherein the referential voltage generating unit comprises a sixth p-channel FET, a fourth operational amplifier, a sixth resistor and a seventh resistor, wherein a source of the sixth p-channel FET is electrically connected to a high voltage, and a drain of the sixth p-channel FET is configured to output the referential voltage to a first end of the sixth resistor, an output end of the fourth operational amplifier is electrically connected to a gate of the sixth p-channel FET, a negative input end of the fourth operational amplifier is electrically connected to the bandgap-voltage generating unit and receives the bandgap-voltage, a positive input end of the fourth operational amplifier is electrically connected to a second end of the sixth resistor and a first end of the seventh resistor, a second end of the seventh resistor is electrically connected to a low voltage, and the second end of the sixth resistor is electrically connected to the differential current generating unit.

8. A circuit system comprising:

the referential voltage generating device according to claim 1; and at least one function circuit electrically connected to the referential voltage generating device, and configured to receive the referential voltage and execute at least one function based on the referential voltage.

9. The circuit system according to claim 8, wherein the function circuit is a voltage regulator, a digital-to-analog converter, an analog-to-digital converter, a microcontroller, a transmitter, a receiver, a digital signal processor, a central processing unit, a transceiver, an image processor, an audio processor, an internet of things device, a memory device, or a storage device.

10. A referential voltage generating device for generating a referential voltage, comprising:

a bandgap-voltage generating unit, configured to generate a first negative temperature coefficient current and a positive temperature coefficient voltage, and generate a second negative temperature coefficient current and a bandgap-voltage based on the first negative temperature coefficient current and the positive temperature coefficient voltage;

a control-comparison unit electrically connected to the bandgap-voltage generating unit, configured to receive the second negative temperature coefficient current and the bandgap-voltage, generate a negative temperature coefficient voltage based on the second negative temperature coefficient current, and generate a control voltage based on a difference voltage value between the negative temperature coefficient voltage and the bandgap-voltage;

a differential current generating unit electrically connected to the control-comparison unit, configured to receive the control voltage and generating a differential current based on the control voltage, wherein the differential current is proportional to an absolute voltage value of the control voltage; and a referential voltage generating unit electrically connected to the bandgap-voltage generating unit and the differential current generating unit, configured to receive the bandgap-voltage and the differential current, and generate the referential voltage based on the bandgap-voltage and the differential current.

* * * * *